US007639808B2

(12) United States Patent
Izu et al.

(10) Patent No.: US 7,639,808 B2
(45) Date of Patent: Dec. 29, 2009

(54) ELLIPTIC CURVE CRYPTOSYSTEM APPARATUS, ELLIPTIC CURVE CRYPTOSYSTEM METHOD, ELLIPTIC CURVE CRYPTOSYSTEM PROGRAM AND COMPUTER READABLE RECORDING MEDIUM STORING THE ELLIPTIC CURVE CRYPTOSYSTEM PROGRAM

(75) Inventors: Tetsuya Izu, Kawasaki (JP); Kouichi Itoh, Kawasaki (JP); Masahiko Takenaka, Kawasaki (JP); Naoya Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 758 days.

(21) Appl. No.: 11/311,590

(22) Filed: Dec. 16, 2005

(65) Prior Publication Data

US 2006/0093137 A1 May 4, 2006

Related U.S. Application Data

(63) Continuation of application No. PCT/JP03/10003, filed on Aug. 6, 2003.

(51) Int. Cl.
*H04K 1/00* (2006.01)
*H04L 9/32* (2006.01)
(52) U.S. Cl. .................... 380/255; 380/28; 713/189
(58) Field of Classification Search ......... 380/255–256, 380/277, 28, 30; 713/171, 174, 189
See application file for complete search history.

(56) References Cited

U.S. PATENT DOCUMENTS 5,854,759 A * 12/1998 Kaliski et al. ............... 708/492
6,212,279 B1 * 4/2001 Reiter et al. ................ 380/278
7,162,033 B1 * 1/2007 Coron ........................ 380/30

FOREIGN PATENT DOCUMENTS

JP 2002-540483 11/2002

OTHER PUBLICATIONS

Jean-Sébastien Coron, "Resistance against Differential Power Analysis for Elliptic Curve Cryptosystems", Crytographic Hardware and Embedded Systems 1999 (CHES 1999), Lecture Notes in Computer Science, vol. 1717, Springer-Verlag, pp. 292-302.

Tetsuya Izu et al., "A Fast Parallel Elliptic Curve Multiplication Resistant against Side Channel Attacks", Public-Key Cryptography 2002 (PKC2002), Lecture Notes in Computer Science, vol. 2274, pp. 280-296, Springer-Verlag.

Marc Joye et al., "Protections against Differential Analysis for Elliptic Curve Cryptography—An Algebraic Approach", Cryptographic Hardware and Embedded Systems 2001 (CHES2001), Lecture Notes in Computer Science, vol. 2162, pp. 377-390, Springer-Verlag.

(Continued)

*Primary Examiner*—Hosuk Song
(74) *Attorney, Agent, or Firm*—Westerman, Hattori, Daniels & Adrian, LLP

(57) ABSTRACT

An elliptic curve cryptosystem apparatus performing an elliptic curve cryptosystem process has a coordinate transforming unit for transforming coordinates (X:Y:Z) on a point P on an elliptic curve over a finite field GF(p^m) to coordinates (r1×(X−s1):r2×(Y−s2):r3×(Z−s3)) (where, p is a prime number, m is an integer not less than 1, r1, r2 and r3 are integers not less than 1 and not larger than (p−1), s1, s2 and s3 are integer not less than 0 and not larger than (p−1), and a code "^" represents power), and a scalar multiplication operating unit for performing scalar multiplication on the point on the elliptic curve transformed by the coordinate transforming unit, wherein at least one of the parameters s1, s2 and s3 has a value other than 0. The apparatus can perform the scalar multiplication in the elliptic curve cryptosystem, with resistance to side channel attacks.

19 Claims, 5 Drawing Sheets

$E: y^2 = x^3 + ax + b$ (ELLIPTIC CURVE OVER A PRIME FIELD)

ELLIPTIC CURVE ADDITION (ECADD)

$$x_3 = \left(\frac{y_1 - y_2}{x_1 - x_2}\right)^2 - x_1 - x_2$$

$$y_3 = \left(\frac{y_1 - y_2}{x_1 - x_2}\right)(x_1 - x_3) - y_1$$

OTHER PUBLICATIONS

Louis Goubin, "A Refined Power-Analysis Attack on Elliptic Curve Cryptosystems", Public-Key Cryptography 2003 (PKC2003), Lecture Notes in Computer Science, vol. 2567, Springer-Verlag, pp. 199-211.

Christophe Clavier et al., "Universal Exponentiation Algorithm—A First Step towards *Provable* SPA-Resistance", Cryptographic Hardware and Embedded Systems 2001 (CHES2001), Lecture Notes in Computer Science, vol. 2162, Springer-Verlag, pp. 300-308.

Katsuyuki Okeya et al., "On Assumptions of Implementational Attacks and Their Practicality", Proceedings of the 2003 Symposium on Cryptography and Information Security, Jan. 26-29, 2003, English translation.

* cited by examiner

ELLIPTIC CURVE CRYPTOSYSTEM APPARATUS, ELLIPTIC CURVE CRYPTOSYSTEM METHOD, ELLIPTIC CURVE CRYPTOSYSTEM PROGRAM AND COMPUTER READABLE RECORDING MEDIUM STORING THE ELLIPTIC CURVE CRYPTOSYSTEM PROGRAM

This application is a continuation of international application PCT/JP2003/010003 filed on Aug. 6, 2003.

TECHNICAL FIELD

The present invention relates to elliptic curve cryptosystem processing and, particularly, to an elliptic curve cryptosystem apparatus, an elliptic curve cryptosystem method, an elliptic curve cryptosystem program and a computer readable recording medium storing the elliptic curve cryptosystem program suitable for use to defend against power analysis attacks in a processor performing the elliptic curve cryptosystem processing.

BACKGROUND ART

Cryptosystems include public key cryptosystems and common key cryptosystems. Public key cryptosystems use different keys for decryption and encryption. In the typical public key cryptosystems, a key (public key) for encryption is laid open to the public, and a plaintext is encrypted with this public key and sent to a receiver. A key (secret key) for decrypting the ciphertext is held as secret information that only the receiver knows, and the receiver decrypts the ciphertext with the secret key to obtain the plaintext.

Elliptic curve cryptosystem attracts attention as the public key cryptosystem in these years. Various kinds of are known as this elliptic curve cryptosystem, where an operation called scalar multiplication is used in most processings. The scalar multiplication is to compute $d \times P = P + P + \ldots + P$ (sum taken d times) from a point P on an elliptic curve called a base point and an integer d called a scalar. It is known that obtaining a scalar (a secret key) d from the base point P and the scalar multiple point $d \times P$ is infeasible in the elliptic curve cryptosystem.

Here is described ECES cryptosystem as an example of the elliptic curve cryptosystem. When a sender A has a secret key s (s is an integer) and a receiver has a secret key t (t is an integer), an elliptic curve E, a base point P $(=(x,y))$ set on the elliptic curve E, a public key $s \times P$ (a scalar multiple point of the secret key s of the sender A and the base point P), and a public key $t \times P$ (a scalar multiple point of the secret key t of the receiver B and the base point P) are beforehand laid open to the public.

At this time, the sender A performs a scalar multiplication $s \times (t \times P)$ where s is his/her own secret key and $t \times P$ is the public key of the receiver B, obtains bit representation of its x coordinate, generates a ciphertext C of a message m by performing EOR (Exclusive OR) between the former bit representation and a bit representation of the message in a bit-to-bit fashion, and transmits it to the receiver B. The receiver B performs a scalar multiplication $t \times (s \times P)$ where t is his/her own secret key and $s \times P$ is the public key of the sender A, and obtains bit representation of its x coordinate. Considering that a relational expression $$s \times (t \times P) = t \times (s \times p)$$

is established, the receiver B performs EOR operation between its bit representation and bit representation of the ciphertext C to decrypt the ciphertext C in a bit-to-bit fashion, and obtains the message m. As this, the cryptosystem called ECES cryptosystem performs the encryption/decryption processing using a scalar multiplications.

One of the techniques in the field of cryptography, there is one called a cryptanalysis technique. The cryptanalysis technique is for estimating secret information such as a secret key or the like from available information such as a ciphertext. There are various kinds of cryptanalysis methods. As a technique that attracts attention in recent years among them, there is a method called a side channel attack.

The side channel attack is a method invented by Paul Kocher in 1998. The side channel attack estimates key information inside the cryptographic processor by collecting and analyzing side channel information (power consumption data, time consumption data, electromagnetic wave data, etc.) at the time that various input data is given to the cryptographic processor mounted on a smart card or the like. It is indicated that use of the side channel attack may estimate a secret key from the cryptographic processor in both the public key cryptosystem and the common key cryptosystem.

Among the side channel attacks, power analysis attack is powerful. As the power analysis attack, there are known two methods, simple power analysis (SPA; Simple Power Analysis) and differential Power analysis (DPA; Differential Power Analysis). SPA is a method of estimating a secret key from characteristics of several power consumption data of the cryptographic processor. DPA is a method of estimating a secret key by analyzing differences among a number of power consumption data.

The above SPA or DPA can be applied to the elliptic curve cryptosystem. In such case, the scalar multiplication is mostly attacked. The estimating method in detail is described in documents such as Jean-Sebastein Coron "Resistance against Differential Power Analysis for Elliptic Curve Cryptosystems", Cryptographic Hardware and Embedded Systems 1999 (CHES1999), Lecture Notes in Computer Science vol. 1717, Springer-Verlag, pp. 292-302, 1999 (hereinafter referred to as document "Coron99").

Meanwhile, in the cryptographic processing of elliptic curve cryptosystem, the scalar multiplication of a point on an elliptic curve is the most time-consuming part. As the simplest method for realizing the scalar multiplication $d \times P$, there is a binary method. As the binary method, there are a method in which the computation is performed from the most significant bit (Most Significant Bit; MSB) (binary method (MSB)) and a method in which the computation is performed from the least significant bit (Least Significant Bit; LSB) (binary method (LSB)).

Here, an example of the algorithm of the binary method (MSB) is shown as (1) Algorithm 1, and an example of the algorithm of the binary method (LSB) is shown as (2) Algorithm 2. Hereinafter, small letters (d, etc.) represent scalar values, and capital letters (P, T, etc.) represent points on an elliptic curve, unless specifically noted otherwise. Elliptic curve addition is represented as ECADD, and elliptic curve doubling is represented as ECDBL. Further, a code "^" represents a power, and a string of numerical characters sandwiched between "(" and ")$_2$" is a digit represented in binary notation. A numerical character attached S thereto such as "S1:" or the like denotes a step number in the program example representing the algorithm.

| (1) Algorithm 1 [Binary Method (MSB)] |
| --- |
| S1: T:=P |
| S2: for i=n−2 downto 0{ |
| S3:     T:=ECDBL(T) |
| S4:     if(d[i]==1) |
| S5:         T:=ECADD (T,P) ←✗ |
| S6:     } |
| S7: } |
| S8: return(T) | where, T is a temporary variable, d is an n-bit scalar value, and d[i] is the i-th LSB of d.

Considering now that the scalar multiplication d×P is performed for d=21=$2^4+2^2+2^0$=$(0101)_2$. At step S1, a point P is set to a variable T. At the following steps S2 to S7, respective processes corresponding to i=3, 2, 1 and 0 are performed.

When i=3, ECDBL(T) is set to the variable T, and a value of the variable T after processed is 2×P. When i=3, d[i]=d[3]=0, thus the steps S4 to S6 are skipped.

When i=2, ECDBL(T) is set to the variable T, and a value of the variable T after processed is 4×P. When i=2, d[i]=d[2]=1, thus ECADD(T,P) is set to the variable T at step S5 and a value of the variable T after processed is 5×P.

When i=1, ECDBL(T) is set to the variable T at step S3, and a value of the variable after processed is 10×P. When i=1, d[i]=d[1]=0, thus the steps S4 to S6 are skipped.

When i=0, ECDBL(T) is set to the variable T at step S3, a value of the variable T after processed is 20×P. When i=0, d[i]=d[0]=1, thus ECADD(T,P) is set to the variable T at step S5 and a value of the variable after processed is 21×P.

The processes at the step S2 to S7 are completed as above, and a value 21×P of the variable T is outputted at the final step S8. In the binary method (MSB), the process is started with the most significant bit of the scalar value, as above.

| (2) Algorithm 2 [Binary Method (LSB)] |
| --- |
| S1: T[1]:=P |
| S2: T[0]:=0 |
| S3: for i=0 upto n−1{ |
| S4:     if(d[i]==1){ |
| S5:         T[0]:=ECADD(T[0],T[1]) ←✗ |
| S6:     } |
| S7      T[1]:=ECDBL(T[1]) |
| S8: } |
| S9: return(T[0]) | where, T[0] and T[1] are temporary variables, d is an n-bit scalar value, and d[i] is the i-th LSB of d.

Considering now that the scalar multiplication d×P is performed for d=21=$2^4+2^2+2^0$=$(10101)_2$, for example. At the step S1, a point P is set to a variable T[1] and a point 0 is set to a variable T[0]. At the following steps S3 to S8, processes corresponding to i=0, 1, 2, 3 and 4 are performed.

When i=0, d[i]=d[0]=1, thus ECADD(T[0], T[1]) is set to the variable T[0] at step S5, thus a value of the variable T[0] after processed is P. At the step S7, ECDBL(T[1]) is set to the variable T[1], and a value of the variable after processed is 2×P.

When i=1, d[i]=d[1]=0, thus the steps S4 to S6 are skipped. At the step S7, ECDBL(T[1]) is set to the variable T[1], and a value of the variable T[1] after processed is 4×P.

When i=2, d[i]=d[2]=1, thus ECADD(T[0], T[1]) is set to the variable T[0] at step S5 and a value of the variable T[0] after processed is 5×P. At the step S7, ECDBL(T[1]) is set to the variable T[1], and a value of the variable T[1] after processed is 8×P.

When i=3, d[i]=d[3]=0, thus the steps S4 to S6 are skipped. At the step S7, ECDBL(T[1]) is set to the variable T[1], and a value of the variable T[1] after processed is 16×P.

When i=4, d[i]=d[0]=1, thus ECADD(T[0],T[1]) is set to the variable T[0] at the step S5 and a value of the variable T[0] after processed is 21×P. At the step S7, ECDBL(T[1]) is set to the variable T[1], and a value of the variable T[1] after processed is 32×P.

The processes at the steps S3 to S8 are completed as above, and a value 21×P of the variable T[0] is outputted at the final step S9. As this, in binary method (LSB), the process is started with the least significant bit of the scalar value.

When the above Algorithm 1 and Algorithm 2 are used for the scalar multiplication of a point, the process at the step S5 indicated by ✗ is performed or not performed depending on the bit value d[i] of d. The SPA analyzes the secret key d based on this feature. From many experiments, it is known that the power waveforms observed in the ECDBL operation and the ECADD operation exhibit respective distinctive characteristics and are easily distinguished. Accordingly, by measuring the power waveforms generated during the operations of Algorithm 1 or Algorithm 2 in the processor, the secret key d can be determined in accordance with the variations of the order of ECDBL and ECADD operations and the number of occurrences of the operations determined through analysis of the waveforms.

As a countermeasure against SPA, a method called "add-and-double-always" is proposed in the document Coron99, where addition and doubling are always performed. Since ECDBL operation and ECADD operation are alternately performed, this method is secure against SPA. Examples of the algorithms in which "add-and-double-always" is applied to the above-mentioned Algorithm 1 and Algorithm 2 are shown below, as Algorithm 3 and Algorithm 4.

| (3) Algorithm 3 [Binary Method (MSB, add-and-double-always)] |
| --- |
| S1: T[0]:=P |
| S2: for i=n−2 downto 0{ |
| S3:     T[0]:=ECDBL(T[0]) |
| S4:     T[1]:=ECADD(T[0],P) |
| S5:     T[0]:=T[d[i]] |
| S6: } |
| S7: return(T[0]) | where, T[0] and T[1] are temporary variables, d is an n-bit scalar value, and d[i] is the i-th LBS of d.

| (4) Algorithm 4 [Binary Method (LSB, add-and-double-always)] |
| --- |
| S1: T[0]:=0 |
| S2: T[2]:=P |
| S3: for i=0 upto n−1{ |
| S4:     T[1]:=ECADD(T[0],T[2]) |
| S5:     T[2]:=ECDBL(T[2]) |
| S6:     T[0]:=T[d[i]] |
| S7: } |
| S8: return(T[0]) | where, T[0], T[1] and T[2] are temporary variables, d is an n-bit scalar value, and d[i] is the i-th LSB of d.

Use of the above Algorithm 3 and Algorithm 4 can prevent SPA. As a method having a similar effect, a method using "Montgomery-Ladder" is proposed in T. Izu, and T. Takagi, "A Fast Parallel Elliptic Curve Multiplication Resistant against Side Channel Attacks", Public-Key Cryptography 2002 (PKC2002), Lecture Notes in Computer Science vol. 2774, pp. 280-296, Springer-Verlag, 2002 (hereinafter, referred to as document "Izu-Takagi02).

Since "Montgomery-Ladder" always computes ECDBL and ECADD alternately in the scalar multiplication d×P, it is secure against SPA. An example of "Montgomery-Ladder" is shown as Algorithm 5.

---

(5) Algorithm 5 [Montgomery-Ladder]

S1: T[0]:=P
S2: T[1]:=ECDBL(T[0])
S3: for i=n−2 downto 0{
S4:    T[2]:=ECDBL(T[d[i]])
S5:    T[1]:=ECADD(T[0],T[1])
S6:    T[0]:=T[2−d[i]]
S7:    T[1]:=T[1+d[i]]
S8: }
S9: return(T[0])

--- where, T[0], T[1] and T[2] are temporary variables, d is an n-bit scalar value, and d[i] is the i-th LBS of d.

SPA can be prevented by using Algorithms 3 to 5. However, Coron99 describes DPA for these algorithms, and shows that DPA can determine the secret key through analysis in Algorithms 3 to 5. Further, Coron99 proposes a countermeasure against DPA against Algorithms 3 to 5 by introducing representation of a point on an elliptic curve using a random number, called randomized projective coordinates (RPC).

Below, an algorithm which is formed by applying the RPC to Algorithm 3 is shown as Algorithm 3', an algorithm which is formed by applying the RPC to Algorithm 4 is shown as Algorithm 4', and an algorithm which is formed by applying the RPC to Algorithm 5 is shown as Algorithm 5'. Each point represented by the RPC on the elliptic curve is indicated by a variable with a prime ('or').

---

(6) Algorithm 3' [Binary Method (MSB, add-and-double-always, RPC)]

S1: T'[2]:=RPC(P)
S2: T'[0]:=T'[2]
S3: for i=n−2 downto 0{
S4:    T'[0]:=ECDBL(T'[0])
S5:    T'[1]:=ECADD(T'[0],T'[2])
S6:    T'[0]:=T'[d[i]]
S7: }
S8: return(invRPC(T'[0]))

--- where, T'[0], T'[1] and T'[2] are temporary variables, d is an n-bit scalar value, d[i] is the i-th LSB of d, and invRPC represents inverse transform of the RPC representation.

---

(7) Algorithm 4' [Binary Method (LSB, add-and-double-always, RPC)]

S1: T[0]:=0
S2: T'[2]:=RPC(P)
S4: for i=0 upto n−1{
S4:    T'[1]:=ECADD(T'[0],T'[2])

---

(7) Algorithm 4' [Binary Method (LSB, add-and-double-always, RPC)]

S5:    T'[2]:=ECDBL(T'[2])
S6:    T'[0]:=T'[d[i]]
S7: }
S8: return(invRPC(T'[0]))

--- where, T'[0], T'[1] and T'[2] are temporary variables, d is an n-bit scalar value, d[i] is the i-th LSB of d, and invRPC represents inverse transform of the RPC representation.

---

(8) Algorithm 5' [Montgomery-Ladder, RPC]

S1: T'[0]:=RPC(P)
S2: T'[1]:=ECDBL(T'[0])
S3: for i=n−2 downto 0{
S4:    T'[2]:=ECDBL(T'[d[i]])
S5:    T'[1]:=ECADD(T'[0], T'[1])
S6:    T'[0]:= T'[2−d[i]]
S7:    T'[1]:= T'[1+d[i]]
S8: }
S9: return(invRPC(T'[0]))

--- where, T'[0], T'[1] and T'[2] are temporary variables, d is an n-bit scalar value, d[i] is the i-th LSB of d, and invRPC represents inverse transform of the RPC representation.

As a countermeasure against DPA, there is a randomized curve (RC) method having an effect similar to that of RPC, proposed in M. Joye, and C. Tymen, "Protections against differential analysis for elliptic curve cryptography", Cryptographic Hardware and Embedded Systems 2001 (CHES 2001), Lecture Notes in Computer Science vol. 2162, pp. 377-390, Springer-Verlag, 2001 (refer to document Joye-Tymen01).

Like RPC, RC is a countermeasure against DPA and has a random value to represent a point. The way of applying RC is the same as that of applying RPC. Shown below are an algorithm to which the RC is applied to Algorithm 3 as Algorithm 3", an algorithm to which the RC is applied to Algorithm 4 as Algorithm 4", and an algorithm to which the RC is applied to Algorithm 5 as Algorithm 5". Hereinafter, each point represented by RC on the elliptic curve is indicated by a variable with a double prime ("or").

---

(9) Algorithm 3" [Binary Method (MSB, add-and-double-always, RC)]

S1: T"[2]:=RC(P)
S2: T"[0]:= T"[2]
S3: for i=n−2 downto 0{
S4:    T"[0]:=ECDBL(T"[0])
S5:    T"[1]:=ECADD(T"[0], T"[2])
S6:    T"[0]:= T"[d[i]]
S7: }
S8: return(invRC(T"[0])

--- where, T"[0], T"[1] and T"[2] are temporary variables, d is an n-bit scalar value, d[i] is the i-th LSB of d, and invRC represents inverse transform of the RC representation.

(10) Algorithm 4" [Binary Method (LSB, add-and-double-always, RC)]

```
S1: T"[0]:=0
S2: T"[2]:=RC(P)
S3: for i=0 upto n-1{
S4:     T"[1]:=ECADD(T"[0], T"[2])
S5:     T"[2]:=ECDBL(T"[2])
S6:     T"[0]:= T"[d[i]]
S7: }
S8] return(invRC(T"[0]))
``` where, T"[0], T"[1] and T"[2] are temporary variables, d is an n-bit scalar value, d[i] is the i-th LSB of d, and invRC represents inverse transform of the RC representation.

(11) Algorithm 5" [Montgomery-Ladder, RC]

```
S1: T"[0]=RC(P)
S2: T"[1]:=ECDBL(T"[0])
S3: for i=n-2 downto 0{
S4:     T"[2]:=ECDBL(T"[d[i]])
S5:     T"[1]:=ECADD(T"[0], T"[1])
S6:     T"[0]:= T"[2-d[i]]
S7:     T"[1]:= T"[1+d[i]]
S8: }
S9: return(invRC(T"[0]))
``` where, T"[0], T"[1] and T"[2] are temporary variables, d is an n-bit scalar value, d[i] is the i-th LSB of d, and invRC represents inverse transform of the RC representation.

The methods for implementing the scalar multiplication d×P include a method called a window method, other than the above-mentioned binary method (Algorithms 1 and 2), and Montgomery-Ladder (Algorithm 5). For example, in a 4-bit window method, the zeroth to 15th multiples of P are computed and resulted values are stored in a table in the initializing process, the scalar value is divided into 4-bit units (windows), whereby the scalar multiplication is performed. Shown below is an algorithm of the window method (4-bit width) as Algorithm 6.

(12) Algorithm 6 [Window Method (4-bit width)]

```
S01: W[0]=O
S02: W[1]=P
S03: for i=2 upto 15{
S04:    W[i]=ECADD(W[i-1],P)
S05: }
S06: T:=W[d[n-1,n-4]]
S07: for i=n-1 downto 3 step -4{
S08:    T:=ECDBL(T)
S09:    T:=ECDBL(T)
S10:    T:=ECDBL(T)
S11:    T:=ECDBL(T)
S12:    T:=ECADD(T,W[d[i,i-3]])
S13: }
S14: return(T)
``` where, d is an n-bit scalar value and it is assumed that n is a multiple of 4, d[i, i−3] is a 4-bit value of the i-th to (i−3)-th bits of d, and W[i] represents a table for the window method.

Considering now the scalar multiplication for $d=21=2^4+2^2+2^0=(10101)_2=(0001\ 0101)_2$. Since d is 5-bit, not a multiple of 4, 0s are padded to its higher 3 bits so that d is assumed to be 8 bits, for the sake of convenience. At this time, n=8. First, W[0]=O is set as the initial value at step S01, and W[1]=P is set at step S02. Next, steps S03 to S05 are executed for i=2, 3, . . . , and 15. At step S04, W[i]=ECADD(W[i−1],P) is set to each i. At this time, a value set to W[i] is i×P. After the processes at steps S03 to S05 are completed, W[d[n−1,n−4]]= W[d[7,4]]=W[d[0001]]=1×P is set to the variable T at step S06.

Next, processes at steps S07 to S13 are performed on i=3. At step S08, T:=ECDBL(T) is processed, and 2×P is registered to the variable T. At step 09, T:=ECDBL(T) is processed, and 4×P is registered to the variable T. At step S10, T:=ECDBL(T) is processed, and 8×P is registered to the variable T. At step S11, T:=ECDBL(T) is processed, and 16×P is registered to the variable T. At step S12, T:=ECADD (T,W[d[i, i−3]])=ECADD(T,W[0101])=ECADD(16×P,5× P)= 21×P is processed, and 21×P is registered to the variable T.

As above, the processes at steps S07 to S13 are completed. Finally, a value 21×P of the variable T is outputted at step S14. As this, the window method computes the scalar multiplication d×P, using a table beforehand prepared.

When Algorithm 6 (window method) is used for the scalar multiplication of a point, there are no such operations that are performed or not performed depending on the bit value in d. Thus, generally the window method, unlike the binary method, is considered to be secure against SPA. However, the window method, like the binary method, is not secure against DPA, and can be analyzed by the technique of Coron99, but it is known that, for the window method as well as the binary method and Montgomery-Ladder, RPC and RC are effective as countermeasures against DPA. An algorithm which is formed by applying RPC to Algorithm 6 is shown below as Algorithm 6', and an algorithm which is formed by applying RC to Algorithm 6 is also shown below as Algorithm 6".

(13) Algorithm 6' [Window Method (4-bit width), RPC]

```
S01: W'[0]=O
S02: W'[1]=RPC(P)
S03: for i=2 upto 15{
S04:    W'[i]=ECADD(W'[i-1], W'[1])
S05: }
S06: T' := W'[d[n-1,n-4]]
S07: for i=n-5 downto 0 step -4{
S08:    T':=ECDBL(T')
S09:    T':=ECDBL(T')
S10:    T':=ECDBL(T')
S11:    T':=ECDBL(T')
S12:    T':=ECADD(T', W'[d[i,i-3]])
S13: }
S14: return(invRPC(T'))
``` where, d is an n-bit scalar value and it is assumed that n is a multiple of 4, d[i, i−3] is a 4-bit value of the i-th to (i−3)-th bits of d, T' is a temporary variable, W'[i] represents a table for the window method, and invRPC represents inverse transform of the RPC representation.

(14) Algorithm 6" [Window Method (4-bit width, RC)]

```
S01: W"[0]=0
S02: W"[1]=RC(P)
S03: for i=2 upto 15{
S04:    W"[i]=ECADD(W"[i-1], W"[1])
S05: }
S06: T" := W"[d[n-1,n-4]]
S07: for i=n-5 downto 3 step -4{
S08:    T":=ECDBL(T")
S09:    T":=ECDBL(T")
```

-continued

(14) Algorithm 6" [Window Method (4-bit width, RC)]

```
S10:    T" :=ECDBL(T" )
S11:    T" :=ECDBL(T" )
S12:    T" :=ECADD(T" , W" [d[i,i-3]]
S13: }
S14: return(invRC(T" ))
``` where, d is an n-bit scalar value and it is assumed that n is a multiple of 4, d[i, i−3] is a 4-bit value of the i-th to (i-3)-th bits of d, T is a temporary variable, W [i] represents a table for the window method, and invRC represents inverse transform of the RC representation.

Conventionally, it has been considered that the above-mentioned Algorithms 3' to 6' and Algorithms 3" to 6" provide security against both SPA and DPA. Recently, a technique for analyzing these methods has been disclosed in L. Goubin, "A Refined Power-Analysis Attack on Elliptic Curve Cryptosystem", Public-Key Cryptography 2003 (PKC2003), Lecture Notes in Computer Science vol. 2567, Springer-Verlag, pp. 199-210, 2003 (referred to as document Goubin03).

Among points on an elliptic curve, a point whose x coordinate or y coordinate is 0 is called a special point. When the special point appears during the scalar multiplication, SPA and DPA can easily detect that such point appears as an intermediate value. The analyzing method disclosed in the document Goubin03 generates such an artificial base point that the special point appears at the end of computation for a certain d[i], and estimates the value of d[i] according to whether the special point actually appears or not. Hereinafter, an attack using the analyzing method disclosed in the document Goubin03 is referred to as a special point attack, for the sake of convenience.

The binary method and Montgomery-Ladder are not secure against the special point attack. Even when RPC or RC is used, Algorithms 3' to 6' and Algorithms 3" to 6" are not secure against the special point attack because the feature that the coordinate value becomes 0 remains.

As another countermeasure against DPA on Algorithms 3 to 6, there is an exponent-splitting method (ES) proposed in C. Clavier, and M. Joye, "Universal exponentiation algorithm—A first step towards provable SPA-resistance—", Cryptographic Hardware and Embedded Systems 2001 (CHES2001), Lecture Notes in Computer Science vol. 2162, Springer-Verlag, pp. 300-308, 2001 (referred to as document Clavier-Joye01). This ES is a method of randomly changing the scalar value. ES divides the scaler d into d=r+(d−r) by a random number r, performs separately two scalar multiplications, r×P and (d−r)×P, adds results of the two scalar multiplications, using a feature that $$r \times P + (d-r) \times P = d \times P$$

is established, thereby computing d×P.

For the two scalar multiplications, r×P and (d−r)×P, an algorithm resistant to another SPA/DPA is used. Against the special point attack, it is possible to defend because the scalar value is randomly changed. Shown below is an algorithm of the ES as Algorithm 7.

(15) Algorithm 7 [Exponent-splitting]

```
S1: r:=random( )
S2: T1:=scalar(r,P)
```

(15) Algorithm 7 [Exponent-splitting]

```
S3: T2:=scalar(d−r,P)
S4: T:=ECADD(T1,T2)
S5: return(T)
``` where, random( ) is a function generating an n-bit random number, scalar (d,P) is a function for performing the scalar multiplication d×P, concretely, scalar (d,P) is calculated, using the above-mentioned Algorithms 3' to 6' or Algorithms 3" to 6", and variables r, T, T1 and T2 are temporary variables.

It can be said that ES is secure against SPA, DPA and special point attack. However, the scalar multiplication used in ES is itself a countermeasure zagainst SPA and DPA, it is thus wasteful to the apply the ES to Algorithms 3' to 6' or Algorithms 3" to 6" which have already taken countermeasures against SPA and DPA. In particularly, application of these techniques requires the operation of addition and doubling of points on the elliptic curve to be performed a larger number of times than would be the case if they were not applied, resulting in increased overhead to be processed, which is a drawback.

In the light of the above problems, an object of the present invention is to provide an elliptic curve cryptosystem apparatus, an elliptic curve cryptosystem method, an elliptic curve cryptosystem program and a computer readable recording medium storing the elliptic curve cryptosystem program, which makes it difficult to estimate secret information against the special point attack thereby to improve the security of the cryptosystem processing.

Non-patent Document 1 (Document Coron99) Jean-Sebastein Coron "Resistance against Differential Power Analysis for Elliptic Curve Cryptosystems", Cryptographic Hardware and Embedded Systems 1999 (CHES1999), Lecture Notes in Computer Science vol. 1717, Springer-Verlag, pp. 292-302, 1999

Non-patent Document 2 (Document Izu-Takagi02): T. Izu, and T. Takagi, "A Fast Parallel Elliptic Curve Multiplication Resistant against Side Channel Attacks", Public-Key Cryptography 2002 (PKC2002), Lecture Notes in Computer Science vol. 2274, pp. 280-296, Springer-Verlag, 2002.

Non-patent Document 3 (Document Joye-Tymenol): M. Joye, and C. Tymen, "Protections against differential analysis for elliptic curve cryptography", Cryptographic Hardware and Embedded Systems 2001 (CHES2001), Lecture Notes in Computer Science vol. 2162, pp. 377-390, Springer-Verlag, 2001.

Non-patent Document 4 (Document Goubin03) L. Goubin, "A Refined Power-Analysis Attack on Elliptic Curve Cryptosystem", Public-Key Cryptography 2003 (PKC2003), Lecture Notes in Computer Science vol. 2567, Springer-Verlag, pp. 199-210, 2003.

Non-patent Document 5 (Document Clavier-Joye01): C. Clavier, and M. Joye, "Universal exponentiation algorithm—A first step towards provable SPA-resistance—", Cryptographic Hardware and Embedded Systems 2001 (CHES2001), Lecture Notes in Computer Science vol. 2162, Springer-Verlag, pp. 300-308, 2001.

DISCLOSURE OF INVENTION

To attain the above object, the present invention provides an elliptic curve cryptosystem apparatus performing an elliptic curve cryptosystem process comprising a coordinate transforming unit for transforming coordinates (X:Y:Z) of a point P on an elliptic curve over a finite field GF (p^m) to coordinates (r1×(X−s1):r2×(Y−s2):r3×(Z−s3)) (where p is a prime number, m is an integer not less than 1, r1, r2 and r3 are integers not less than 1 and not larger than (p−1), s1, s2 and s3 are integers not less than 0 and not larger than (p−1), and a code "^" represents power), and a scalar multiplication operating unit for performing scalar multiplication on the point on the elliptic curve transformed by the coordinate transforming unit, at least any one of the parameters s1, s2 and s3 having a value other than 0.

The scalar multiplication operating unit may perform the scalar multiplication in a binary method using add-and-double-always, or may perform the scalar multiplication in a Montgomery-Ladder method, or may perform the scalar multiplication in a window method.

Further, the scalar multiplication operating unit may perform the scalar multiplication in an x-coordinate-only method, or may perform the scalar multiplication, using successive elliptic curve doublings.

The present invention further provides an elliptic curve cryptosystem method for performing an elliptic curve cryptosystem process comprising a coordinate transforming step of transforming coordinates (X:Y:Z) of a point P on an elliptic curve over a finite field GF (p^m) to coordinates (r1×(X−s1): r2×(Y−s2):r3×(Z−s3)) (where p is a prime number, m is an integer not less than 1, r1, r2 and r3 are integers not less than 1 and not larger than (p−1), s1, s2 and s3 are integers not less than 0 and not larger than (p−1), and a code "^" represents power), and a scalar multiplication operating step of performing scalar multiplication on the point on the elliptic curve transformed at the coordinate transforming step, at least any one of the parameters s1, s2 and s3 having a value other than 0.

At the scalar multiplication operating step, the scalar multiplication may be performed in a binary method using add-and-double-always, or may be performed in a Montgomery-Ladder method, or may be performed in a window method.

Further, at the scalar multiplication operating step, the scalar multiplication may be performed in an x-coordinate-only method, or may be performed, using successive elliptic curve doublings.

The present invention still further provides an elliptic curve cryptosystem program for performing an elliptic curve cryptosystem process making a computer function as a coordinate transforming unit for transforming coordinates (X:Y:Z) of a point P on an elliptic curve over a finite field GF (p^m) to coordinates (r1×(X−s1):r2×(Y−s2):r3×(Z−s3)) (where p is a prime number, m is an integer not less than 1, r1, r2 and r3 are integers not less than 1 and not larger than (p−1), s1, s2 and s3 are integers not less than 0 and not larger than (p−1) and at least any one of s1, s2 and s3 has a value other than 0, and a code "^" represents power), and a scalar multiplication operating unit for performing scalar multiplication on the point on the elliptic curve transformed by the coordinate transforming unit.

When the computer functions as the scalar multiplication operating unit, the scalar multiplication may be performed in a binary method using add-and-double-always, or may be performed in a Montgomery-Ladder method, or may be performed in a window method.

Further, when the computer functions as the scalar multiplication operating unit, the scalar multiplication is performed in an x-coordinate-only method, or may be performed, using successive elliptic curve doublings.

A computer readable recording medium according to this invention is recorded thereon the above-mentioned elliptic curve cryptosystem program.

The elliptic curve cryptosystem apparatus, the elliptic curve cryptosystem method, the elliptic curve cryptosystem program and the computer readable recording medium storing the elliptic curve cryptosystem program provide the following working effects and advantages.

(1) Since coordinates (X:Y:Z) of a point P on an elliptic curve over a finite field GF (p^m) are transformed to coordinates (r1×(X−s1):r2×(Y−s2):r3×(Z−s3)) (where, p is a prime number, m is an integer not less than 1, r1, r2 and r3 are random integers not less than 1 and not larger than (p−1), s1, s2 and s3 are random integers not less than 0 and not larger than (p−1) and at least any one of s1, s2 and s3 has a value other than 0, and a code ^ represents power) and the scalar multiplication is performed on the transformed point on the elliptic curve, the scalar multiplication in the elliptic curve cryptosystem can be performed, with resistance to the side channel attacks.

(2) Particularly, since at least any one of S1, s2 and s3 has a value other than 0, the specific point has a value other than 0 at a coordinate in the linear transform coordinate, thus does not appear during the scalar multiplication, which provides security to the special point attack.

(3) The scalar multiplication is performed in a binary method using add-and-double-always, which provides security against SPA and DPA.

(4) The randomizing effect as same as RPC in Jacobian coordinates can be expected, which provides security against DPA.

(5) The scalar multiplication is performed in Montgomery-Ladder, which provides security against SPA and DPA.

(6) The scalar multiplication is performed in the x-coordinate-only method, which provides security against SPA and DPA and can reduce the computation time.

(7) The scalar multiplication is performed in the window method, which provides security against SPA and DPA.

(8) The scalar multiplication is performed, using successive elliptic curve doublings, which allows high-speed arithmetic operations.

BEST MODE FOR CARRYING OUT THE INVENTION

Figure 1:
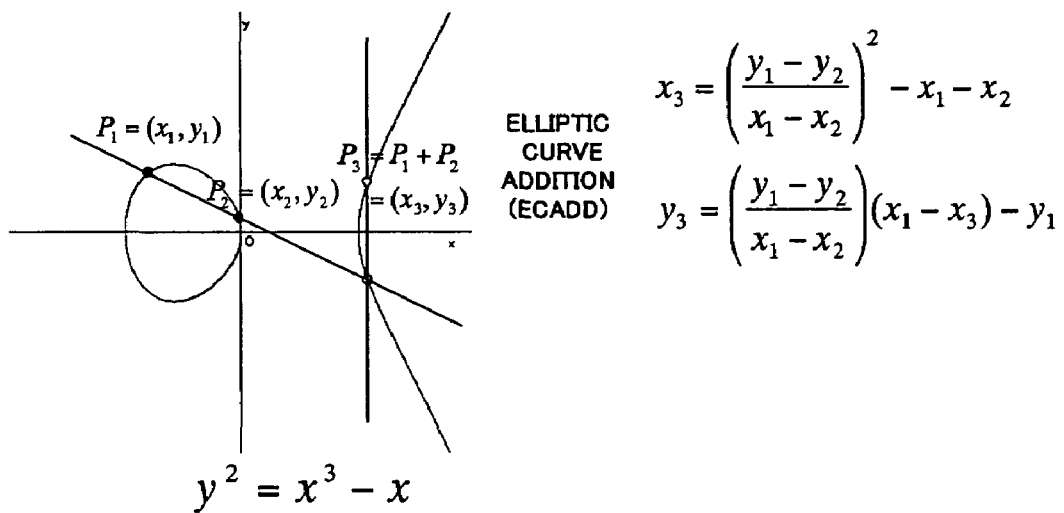
FIG. 1 is a diagram for illustrating elliptic curve addition.

Hereinafter, description will be made of embodiments of the present invention with reference to the drawings.

(a) Basic Explanation

An elliptic curve cryptosystem apparatus according to an embodiment of this invention is realized as an information processing apparatus exclusive for elliptic curve cryptosystem, a personal computer, an IC chip built in an IC card (smart card) or the like, a mobile phone, a mobile information terminal or the like (for example, PDA: Personal data assistant), a DVD player, etc., which includes a processor performing arithmetic operations.

Described below is an elliptic curve cryptosystem arithmetic method according to this invention applied to an elliptic curve over a finite field GF (p^m) with p^m elements where p is a prime number and m is an integer not less than 1. Hereinafter, small letters (d, etc.) represent scalar values, and capital letters (P, T, etc.) represent points on the elliptic curve, unless specifically noted otherwise. Further, the elliptic addition is represented as ECADD, and the elliptic doubling is represented as ECDBL. Still further, a code "^" represents power, a string of numerical characters sandwiched between "(" and ")$_2$" represents a digit represented in binary notation. A numerical character with S such as "S01:" or the like represents a step number in a program example representing an algorithm.

An elliptic curve E over a finite field GF (p^m) is a set of points (x,y) satisfying the following equation and a point ∞ called the point at infinity (hereinafter, referred to as a zero point, occasionally). Incidentally, the point at infinity is occasionally expressed as 0.

$$E: Y^2 + a1 \times x \times y + a3 \times y = x^3 + a2 \times x^2 + a4 \times x + a6$$

where, a1, a2, a3, a4, a6, x and y are elements of GF (p^m). A point on the elliptic curve can be represented in a coordinate system such as (x,y), but the point at infinity ∞ is the only one point that cannot be represented in a coordinate system such as (x,y).

For a point P on the elliptic curve E over GF (p^m), an inverse −P of P is defined as follows.
(1) If P=∞, −P=∞
(2) If P≠∞, $$-P = (x, -y - a1 \times x - a3)$$

when P=(x, y).

Let P1 and P2 are points on the elliptic curve E over GF (p^m). Then P3=P1+P2, which is a sum of P1 and P2, is defined as follows.
(1) If P1=∞, P3=P2
(2) If P2=∞, P3=P1
(3) If P1=−P2, P3=∞
(4) If P1≠−P2

$$x3 = \lambda^2 + a1 \times \lambda - a2 - x1 - x2$$

$$y3 = -(\lambda + a1) \times x3 - \nu - a3$$

where P1=(x1, y1), P2=(x2, y2), P3=(x3, y3). Provided, when P1≠P2, it is defined that $$\lambda = (y2 - y1)/(x2 - x1)$$

$$\nu = (y1 \times x2 - y2 \times x1)/(x2 - x1)$$

when P1=P2, it is defined that $$\lambda = (3 \times x1^2 + 2 \times a2 \times x + a4 - a1 \times y1)/(2 \times y1 + a1 \times x1 + a3)$$

$$\nu = (-x1^3 + a4 \times x1 + 2 \times a6 - a3 \times y1)/(2 \times y1 + a1 \times x1 + a3)$$

When P1≠P2, computation of P1+P2 is referred to as elliptic curve addition (ECADD). When P1=P2, computation of P1+P=2×P1 is referred to as elliptic curve doubling (ECDBL). Elliptic curve addition and elliptic curve doubling are accomplished by a combination of addition, subtraction, multiplication, squaring and inversion in the finite field GF(p^m).

When p is a prime number, the finite field GF(p) is referred to as a prime field. Particularly, when p is a prime number not less than 5, the elliptic curve E over the prime field GF(p) is a set obtained by adding a point ∞ called the point at infinity to a set of points (x, y) satisfying the following equation:

$$E: Y^2 = x^3 + a \times x + b$$

Incidentally, the point at infinity ∞ is also referred to as 0. a, b, x and y are elements of GF(p). A point on an elliptic curve can be represented in a coordinate system such as (x, y), but the point at infinity ∞ is the only one point that cannot be represented in a coordinate system such as (x, y).

For a point P on the elliptic curve E over GF(p), an inverse −P of P is defined as follows.
(1) If P=∞, −P=∞
(2) If P≠∞, −P=(x, −y) when P=(x, y)

Let P1 and P2 are two points on the elliptic curve E over GF(p). Then P3=P1+P2, which is a sum of P1 and P2, is defined as follows.
(1) If P1=∞, P3=P2
(2) If P2=∞, P3=P1
(3) If P1=−P2, P3=∞
(4) If P1≠−P2, $$x3 = \lambda^2 - x1 - x2$$

$$y3 = -\lambda \times x3 - \nu$$

where P1=(x1, y1), P2=(x2, y2) and P3=(x3, y3). Provided, it is defined that when P1≠P2, $$\lambda = (y2 - y1)/(x2 - x1)$$

$$\nu = (y1 \times x2 - y2 \times x1)/(x2 - x1), \text{ and}$$

when P1=P2, $$\lambda = (3 \times x1^2 + a)/(2 \times y1)$$

$$\nu = (-x1^3 + a \times x1 + 2 \times b)/(2 \times y1)$$

When P1≠P2, computation of P1+P2 is referred to as elliptic curve addition (ECADD). When P1=P2, computation of P1+P2=2×P1 is referred to as elliptic curve doubling (ECDBL). Elliptic curve addition and elliptic curve doubling are accomplished by a combination of addition, subtraction, multiplication, squaring and inversion in the finite field GF(p).

Figure 2:
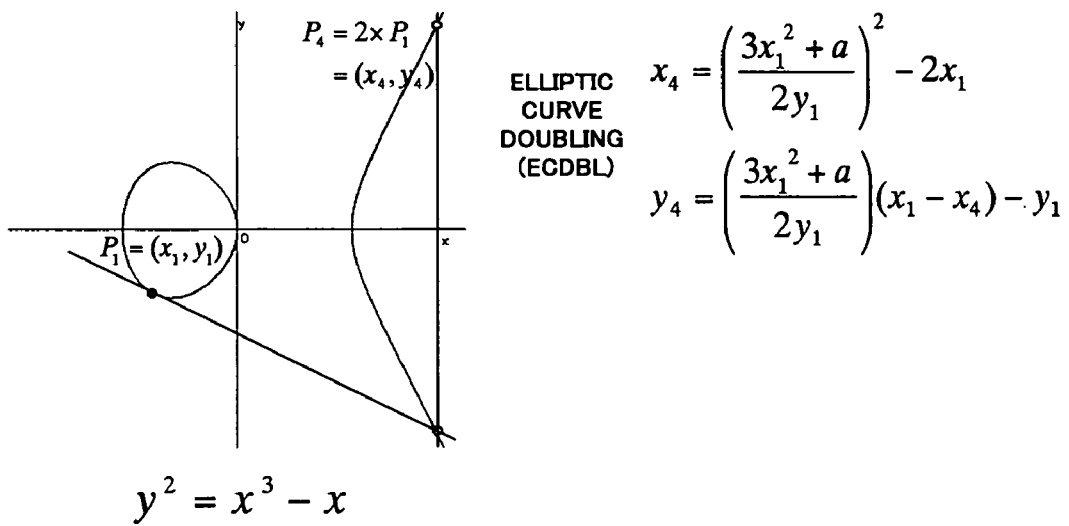
FIG. 2 is a diagram for illustrating elliptic curve doubling.

FIG. 1 is a diagram for illustrating the elliptic curve addition. FIG. 2 is a diagram for illustrating the elliptic doubling. As shown in FIG. 1, elliptic curve addition is defined as a point P3=P1+P2=(x3, y3) obtained by turning an intersection point of a straight line connecting a point P1=(x1,y1) and a point P2=(x2,y2) and the elliptic curve over the x-axis. As shown in FIG. 2, elliptic curve doubling is defined as a point P4=P1+P1=2×P1=(x4,y4) obtained by turning an intersection point of the tangent at a point P1=(x1,y1) and the elliptic curve over the x-axis.

Scalar multiplication is computing a point d×P=P+P+ . . . P (sum taken d times) for the elliptic curve E over the finite field, for a point P referred to as a base point on the curve, and for an integer d referred to as a scalar. The scalar multiplication is represented by a combination of the elliptic curve addition and the elliptic curve doubling.

The computation time of the elliptic curve addition, the elliptic curve doubling, and the scalar multiplication is frequently estimated by a sum of the computation times of multiplication, squaring, and inversion in the finite field. This is because the practical computations of elliptic curve addition, elliptic curve doubling, and scalar multiplication are a combination of addition, subtraction, multiplication, squaring, and inversion in the finite field, and in many cases, the computation time of addition and subtraction is comparatively shorter than the computation time of others, and can be ignored.

Normally, the computation time of the inversion in the finite field $GF(p^m)$ is much longer than that of the multiplication and squaring. Therefore, in the elliptic curve cryptosystem apparatus according to this invention, linearly-transformed coordinates are used in representing a point on an elliptic curve.

In a linearly-transformed coordinate system used in this invention, a point on the elliptic curve over $GF(p^m)$ is represented by a combination of three elements such as (X:Y:Z). However, it is assumed that (X:Y:X) is the same point as $(r1 \times (X-s1):r2 \times (Y-s2):r3 \times (Z-s3))$ for the elements $r1 \neq 0$, $r2 \neq 0$, $r3 \neq 0$, s1, s2 and s3 of $GF(p^m)$.

In an elliptic curve cryptosystem apparatus 11, the linearly-transformed coordinates are used to transform coordinates (X:Y:Z) of a point P on the elliptic curve over the finite field to coordinates $(r1 \times (X-s1):r2 \times (Y-s2):r3 \times (Z-s3)$ where r1, r2 and r3 are arbitrary integers other than 0, and at least any one of s1, s2 and s3 is an integer other than 0. Hereinafter, r1, r2, r3, s1, s2 and s3 are referred to as parameters of the linearly-transformed coordinates, occasionally.

With the linearly-transformaed coordinates, every point on the elliptic curve can be represented in a coordinate system such as (X:Y:Z) The point at infinity is represented as $\infty = (0:1:0)$.

When the parameters of the linearly-transformed coordinates are represented as (r1, r2, r3, s1, s2 , s3), (r1, r2, r3, s1, s2 , s3)=(r, r, r, 0, 0, 0) which can be used as projective coordinates, or (r1, r2, r3, s1, s2 , s3)=$(r^2, r^3, r, 0, 0, 0)$, which can be used as Jacobian coordinates.

Described below is a case where an elliptic curve cryptosystem arithmetic method according to this invention is applied to an elliptic curve over a finite field GF(p) (p is a prime number not less than 5) where p is a prime number not less than 5 and the number of elements is p.

The elliptic curve E over GF(p) can be represented in the following equation.

$$E: Y^2 = x^3 + a \times x + b$$

Where, a, b, x and y are elements of GF(p), which satisfy $4 \times a^3 + 27 \times b^2 \neq 0$.

Figure 3:
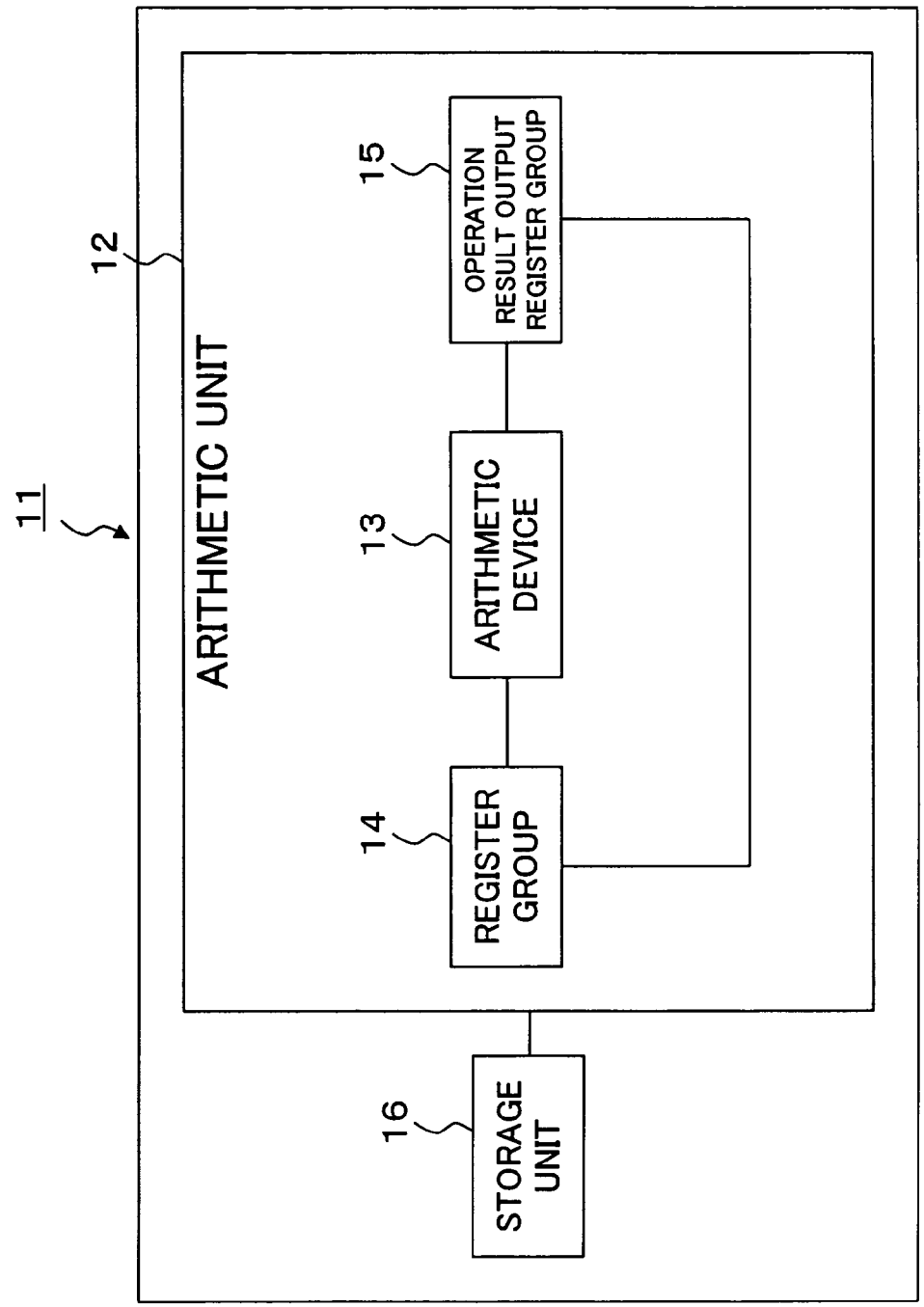
FIG. 3 is a diagram showing a structure of an essential part of an elliptic curve cryptosystem apparatus according to this invention.

FIG. 3 is a diagram showing a structure of the elliptic curve cryptosystem apparatus 11 according to this invention. The elliptic curve cryptosystem apparatus 11 comprises, as shown in FIG. 3, an arithmetic unit (processor) 12 and a storage unit 16. The storage unit 15 stores arithmetic programs for elliptic curve addition, elliptic curve doubling, elliptic curve $2^k$ multiplication, etc.

The arithmetic unit 12 comprises an arithmetic device 13, a register group 14 and an operation result output register group 15. The arithmetic device 13 executes an elliptic curve cryptosystem program stored in the storage unit 16, using the register group 14. The arithmetic unit 12 outputs results of the arithmetic operations to the arithmetic operation result output register group 15.

Each of the register group 14 and the operation result output register group 15 is comprised of a plurality of registers, which store numeral values for the arithmetic operations, results obtained by the arithmetic operations, memory addresses of codes that are executed at present, a state of the CPU, etc. In the operation result output register group 15, results of the arithmetic operation by the arithmetic device 13 are stored, particularly.

Figure 4:
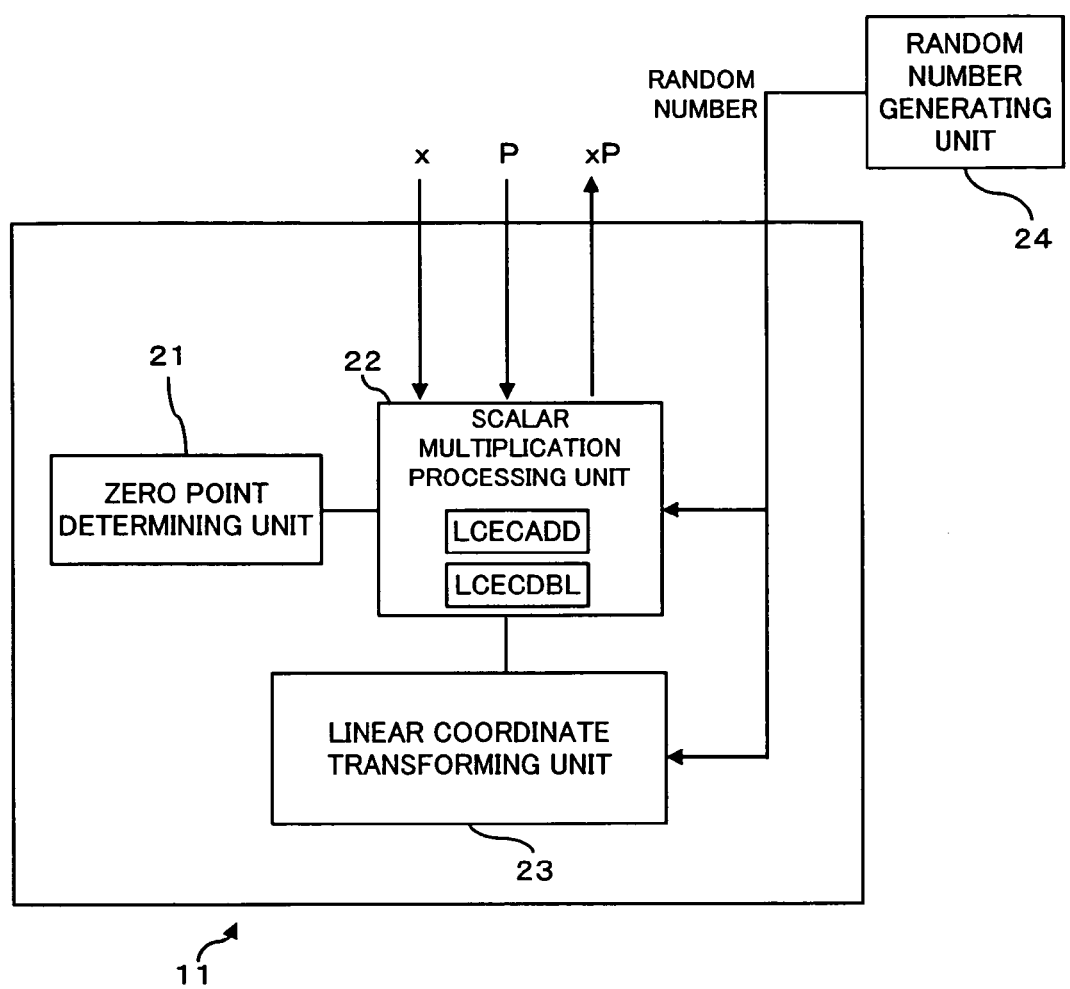
FIG. 4 is a block diagram showing a functional structure of an elliptic curve cryptosystem apparatus according to an embodiment of this invention.

FIG. 4 is a block diagram showing a functional structure of the elliptic curve cryptosystem apparatus 11 according to the embodiment of this invention. As shown in FIG. 4, the elliptic curve cryptosystem apparatus 11 comprises a zero point determining unit 21, a scalar multiplication processing unit 22, a linear coordinate transforming unit (coordinate transforming unit) 23 and a random number generating unit 24.

The random number generating unit 24 generates random numbers r1, r2 and r3, and hands the generated random numbers r1, r2 and r3 to the scalar multiplication processing unit 22 and the linear coordinate transforming unit 23.

The zero point determining unit 21 determines whether or not a result of the scalar multiplication is a zero point (the point at infinity).

The linear coordinate transforming unit 23 transforms (linear coordinate transform) coordinates (X:Y:Z) of a point P on the elliptic curve over the finite field GF(p) to coordinates $(r1 \times (X-s1):r2 \times (Y-s2):r3 \times (Z-s3))$, and hands the transformed coordinates (hereinafter referred to as linear transform coordinates, occasionally) to the scalar multiplication processing unit 22. The scalar multiplication processing unit (scalar multiplication operating unit) 22 performs the scalar multiplication $d \times P$ of the point on the elliptic curve transformed by the linear coordinate transforming unit 23 by performing operations such as elliptic curve addition, elliptic curve doubling, elliptic curve $2^k$ multiplication, etc., using various algorithms to be described later.

In the elliptic curve cryptosystem apparatus 11, the arithmetic unit 12 executes programs stored in the storage unit 15 to function as the zero point determining unit 21, the scalar multiplication processing unit 22, the linear coordinate transforming unit 23 and the random number generating unit 24, for example.

When performing the scalar multiplication $d \times P$, the scalar multiplication processing unit 22 performs elliptic curve addition and elliptic curve doubling on the transformed linear transform coordinates. Namely, the scalar multiplication processing unit 22 performs elliptic curve addition (hereinafter referred to as LCECADD) and elliptic curve doubling (hereinafter referred to as LCECDBL) in the linear transform coordinates of parameters (r1, r2, r3, s1, s2 , s3)=$(r^2, r^3, r, s, 0, 0)$ on the elliptic curve E over the prime field GF(p).

A computation algorithm for the elliptic curve addition at this time is shown as Algorithm 8, and a computation algorithm for the elliptic curve doubling is shown as Algorithm 9, below.

---

(a-1) Algorithm 8 [LCECADD (parameters $(r^2, r^3, r, s, 0, 0)$)]
Input: P1=(X1:Y1:Z1),P2=(X2:Y2:Z2),s
Output: P3=(X3:Y3:Z3)=(X1:Y1:Z1)+(X2,Y2,Z2)

S01: if (Z1==0) then return (P2)
S02: if (Z2==0) then return (P1)
S03: T1 =Z1^2           /* $Z1^2$ */
S04: T2 =Z1*T1          /* $Z1^3$ */
S05: T3 =Z2^2           /* $Z2^2$ */
S06: T4 =Z2*T3          /* $Z2^3$ */
S07: T5 =X1*T3          /* $X1*Z2^2$ */
S08: T6 =s*T3           /* $s*Z2^2$ */
S09: T7 =X2*T1          /* $X2*Z1^2$ */

-continued (a-1) Algorithm 8 [LCECADD (parameters $(r^2, r^3, r, s, 0, 0)$)]
Input: P1=(X1:Y1:Z1),P2=(X2:Y2:Z2),s
Output: P3=(X3:Y3:Z3)=(X1:Y1:Z1)+(X2,Y2,Z2)

| | |
|---|---|
| S10: T8 =s*T1 | /* s*Z1^2 */ |
| S11: T9 =Y1*T4 | /* S1=Y1*Z2^3 */ |
| S12: T10=Y2*T2 | /* S2=Y2*Z1^3 */ |
| S13: T11=T7−T5 | /* X2*Z1^2−X1*Z2^2 */ |
| S14: T12=T11−T8 | /* U2−X1*Z2^2 */ |
| S15: T13=T12+T6 | /* U2−U1=W */ |
| S16: T14=T7+T5 | /* X2*Z1^2+X1*Z2^2 */ |
| S17: T15=T14−T8 | /* U2+X1*Z2^2 */ |
| S18: T16=T15−T6 | /* U2+U1=T */ |
| S19: T17=T10−T9 | /* S2−S1=R */ |
| S20: T18=T10+T9 | /* S2+S1=M */ |
| S21: T19=T17^2 | /* R^2 */ |
| S22: T20=T13^2 | /* W^2 */ |
| S23: T21=T16*T20 | /* T*W^2 */ |
| S24: T22=T19+s | /* R^2+s */ |
| S25: X3 =T22−T21 | /* R^2−T*W^2+s */ |
| S26: T23=2*X3 | /* 2*R^2−2*T*W^2+2*s */ |
| S27: T24=T23−T21 | /* 2*R^2−3*T*W^2+2*s */ |
| S28: T25=2*s | /* 2*s */ |
| S29: T26=T25−T24 | /* 3*T*W^2−2*R^2=V */ |
| S30: T27=T25*T17 | /* V*R */ |
| S31: T28=T18*T13 | /* M*W */ |
| S32: T29=T28*T20 | /* M*W^3 */ |
| S33: Y3 =(T27−T29)/2 | /* (V*R−M*W^3)/2 */ |
| S34: T30=Z1*Z2 | /* Z1*Z2 */ |
| S35: Z3 =T30*T13 | /* Z1*Z2*W */ |
| S36: return((X3:Y3:Z3)) | |

(a-2) Example of Computation of Algorithm 9 [LCECDBL (parameters $(r^3, r^3, r, s, 0, 0)$)]
Input: P1=(X1:Y1:Z1),s,a
Output: P4=(X4:Y4:Z4)=2×(X1:Y1:Z1)

| | |
|---|---|
| S01: if (Z1==0) then return (P1) | |
| S02: T1 =Z1^2 | /* Z1^2 */ |
| S03: T2 =T1^2 | /* Z1^4 */ |
| S04: T3 =a*T2 | /* a*Z1^4 */ |
| S05: T4 =X1^2 | */ X1^2 */ |
| S06: T5 =2*X1 | */ 2*X1 */ |
| S07: T6 =s−T5 | */ s−2*X1 */ |
| S08: T7 =s*T6 | */ s*(s−2*X1) */ |
| S09: T8 = 3*T4 | */ 3*X1^2 */ |
| S10: T9 =3*T7 | */ 3*s*(s−2*X1) */ |
| S11: T10=T3+T8 | */ a*Z1^4+3*X1^2 */ |
| S12: T11=T10+T9 | */ W+3*(X1−s)^2=M */ |
| S13: T12=Y1^2 | */ Y1^2 */ |
| S14: T13=X1*T12 | */ X1*Y1^2 */ |
| S15: T14=s*T12 | */ s*Y1^2 */ |
| S16: T15=T12^2 | */ Y1^4 */ |
| S17: T16=8*T15 | */ 8*s*M */ |
| S18: T17=T11^2 | */ M^2 */ |
| S19: T18=8*T13 | */ 8*X1*Y1^2 */ |
| S20: T19=8*T14 | */ 8*s*Y1^2 */ |
| S21: T20=T17+s | */ M^2+s */ |
| S22: T21=T20−T18 | */ M^2−8*X1*Y1^2+s */ |
| S23: X4 =T20+T19 | */ M^2−2*S+s */ |
| S24: T22=4*T13 | */ 4*X1*Y1^2 */ |
| S25: T23=4*T14 | */ s*Y1^2 */ |
| S26: T24=T22+s | */ 4*X1*Y1^2+s */ |
| S27: T25=T24−X4 | */ 4*X1*Y1^2+s−X4 */ |
| S28: T26=T25−T23 | */ S−X4+s */ |
| S29: T27=T11*T26 | */ M*(S−X4+s) */ |
| S30: Y4 =T27−T16 | */ M*(S−X4+s)−T */ |
| S31: T28=Y1*Z1 | */ Y1*Z1 */ |
| S32: Z4 =2*T28 | */ 2*Y1*Z1 */ |
| S33: return (X4:Y4:Z4) | |

The elliptic curve cryptosystem apparatus 11 according to a first embodiment of this invention uses the binary method (LSB, add-and-double-always) when the scalar multiplication processing unit 22 performs the scalar multiplication d×P. Shown below is an example of the algorithm used for the scalar multiplication by the scalar multiplication processing unit 22 as Algorithm 10.

In the elliptic curve cryptosystem apparatus 11 according to the first embodiment, the linear coordinate transforming unit 23 transforms coordinates (X:Y:Z) of a point P on the elliptic curve E over the prime field GF(p) to coordinates (r1×(X−s1):r2×(Y−s2):r3×(Z−s3)) on the basis of parameters (r1, r2, r3, s1, s2, s3)=($r^2$, $r^3$, r, s, 0, 0). Namely, the linear coordinate transforming unit 23 transforms (linear coordinate transform) coordinates (X:Y:Z) of a point P on an elliptic curve to coordinates ($r^2$×(X−s):$r^3$XY:r×Z).

(b-1) Algorithm 10 [Binary Method (LSB, add-and-double-always, parameters $(r^2, r^3, r, s, 0, 0)$)]

```
S1: T[0]:=LC(O)
S2: T[2]:=LC(P)
S3: for i=0 upto n−1{
S4:     T[1]:=LCECADD(T[0],T[2])
S5:     T[2]:=LCECDBL(T[2])
S6:     T[0]:=T[d[i]]
S7: }
S8: return(invLC(T[0]))
``` where, LC represents transform (linear coordinate transform) to linear mapping coordinates, invLC represents its inverse transform, T[0], T[1] and T[2] are temporary variables, d is an n-bit scalar value, and d[i] is the i-th lower bit of d.

Namely, in the elliptic curve cryptosystem apparatus 11 according to the first embodiment, the arithmetic unit 12 executes steps S1 and S2 of the above Algorithm 10, thereby functioning as the linear coordinate transforming unit 23, and executes steps S3 to S7, thereby functioning as the scalar multiplication processing unit 22.

According to the elliptic curve cryptosystem apparatus 11 of the first embodiment, the linear coordinate transforming unit 23 transforms coordinates (X:Y:Z) of a point P on an elliptic curve E over the prime field GF(p) to coordinates (r1×(X−s1):r2×(Y−s2):r3×(Z−s3) on the basis of parameters (r1, r2, r3, s1, s2 , s3)=($r^2$, $r^2$, r, s, 0, 0), and the scalar multiplication processing unit 22 performs the elliptic curve addition and the elliptic curve doubling in the transformed linear transform coordinates to yield s≠0. Therefore, the special point whose x coordinate is 0 is represented as a point whose X coordinate is s in the linear transform coordinates, thus does not appear during the scalar multiplication. Accordingly, this invention is secure against the special point attack.

Algorithm 10 used by the scalar multiplication processing unit 22 uses add-and-double-always, thus this invention is secure against SPA and DPA.

Further, the linear coordinate transforming unit 23 transforms coordinates (X:Y:Z) of a point P on an elliptic curve E over the prime field GF(p) to coordinates (r1×(X−s1):r2×(Y−s2):r3 ×(Z−s3)) on the basis of parameters (r1, r2, r3, s1, s2 , s3)=($r^2$, ($r^3$, r, s, 0, 0), and the scalar multiplication processing unit 22 performs the elliptic curve addition and elliptic curve doubling in linearly-transformed coordinates. Accordingly, the randomizing effect similar to that of RPC in the Jacobian coordinates can be expected, thus this invention is secure against DPA.

(c) DESCRIPTION OF SECOND EMBODIMENT

In Algorithm 10 used in the elliptic curve cryptosystem apparatus 11 according to the above-described first embodiment, a value stored in the variable T[2] has no relation with d, and is not changed except in step S5. Accordingly, it is possible to apply modified add-and-double-always represented by an algorithm shown in Algorithm 11 below as a modification of the binary method (LSB, add-and-double-always).

The elliptic curve cryptosystem apparatus 11 according to the second embodiment of this invention uses modified add-and-double-always shown in Algorithm 11 instead of add-and-double-always when performing the scalar multiplication d×P. Parts other than the above are similar to those of the elliptic curve cryptosystem apparatus 11 according to the above-described first embodiment. Shown below is an example of the algorithm used for the scalar multiplication by the scalar multiplication processing unit 22 as Algorithm 11.

---

(c-1) Algorithm 11 [Binary Method (LSB, modified add-and-double-always, parameters (r^2, r^3, r, s, 0, 0)]

```
S01: T[0]:=LC(O)
S02: T[2]:=LC(P)
S03: T[1]:=T[2]
S04: X0=X(T[2]);Y0=Y(T[2]);Z0=Z(T[2])
S05: T[2]:=LCECDBL((X0:Y0:Z0))
S06: T[0]=T[d[0]];
S07: for(i=1;i<=n-1;i++){
S08:     T[1]:=LCECADD(T[0],T[2])
S09:     T[2]:=LCiECDBL(T[2],(X0:Y0:Z0))
S10:     T[0]=T[d[i]];
S11: }
S12: return(invLC(T[0]))
```
--- where, LC represents transform to the linear mapping coordinates, invLC represents its inverse transform, T[0], T[1] and T[2] are temporary variables, d is an n-bit scalar value, and d[i] is the i-th lower bit of d. Incidentally, the temporary variables in steps S06 and S10 are commonly used.

In the elliptic curve cryptosystem apparatus 11 according to the second embodiment, the arithmetic unit 12 executes steps S01 and S02 in the above Algorithm 11, thereby functioning as the linear coordinate transforming unit 23, and executes steps S03 to S12, thereby functioning as the scalar multiplication processing unit 22.

The elliptic curve cryptosystem apparatus 11 according to the second embodiment of this invention uses the modified add-and-double-always in Algorithm 11 used by the scalar multiplication processing unit 22, thus can provide security against the SPA.

The linear coordinate transforming unit 23 transforms coordinates (X:Y:Z) of a point P on an elliptic curve over the prime field GF(p) to coordinates (r1×(X−s1):r2×(Y−s2):r3×(Z−s3)) on the basis of parameters (r1, r2, r3, s1, s2, s3)=(r^2, r^3, r, s, 0, 0), and the scalar multiplication processing unit 22 performs the elliptic curve addition and elliptic curve doubling in the linearly-transformed coordinates. Accordingly, the randomizing effect similar to that of RPC in the Jacobian coordinates can be expected, thus the apparatus is secure against DPA.

Since s≠0 in the above parameters, the special point whose x coordinates is 0 does not appear during the scalar multiplication because its X coordinate in the linearly-transformed coordinates is s. Therefore, the apparatus is secure against the special point attack.

(d) DESCRIPTION OF THIRD EMBODIMENT

In the elliptic curve cryptosystem apparatus 11 according to a third embodiment of this invention, the linear coordinate transforming unit 23 transforms coordinates (X:Y:Z) of a point on an elliptic curve E over a prime field GF(p) to coordinates (r1×(X−s1):r2×(Y−s2):r3×(Z−s3)) on the basis of parameters (r1, r2, r3, s1, s2, s3)=(r, r, r, s, 0, 0), and the scalar multiplication processing unit 22 performs elliptic curve addition, elliptic curve doubling and elliptic curve addition-doubling by using the x coordinate system.

In the third embodiment, the scalar multiplication processing unit 22 performs the above scalar multiplication in the x-coordinate system, thus the apparatus is secure against SPA and DPA, and can reduce the computation time.

In this embodiment, use of the parameters (r1, r2, r3, s1, s2, s3)=(r, r, r, s, 0, 0) can reduce the computation time.

The x-coordinate-only method is an algorithm which performs elliptic curve addition, elliptic curve doubling and elliptic curve addition-doubling without using the y coordinate. Shown below are examples of algorithms in the x-coordinate-only method disclosed in document Izu-Takagi02 for an elliptic curve represented in the projective coordinate system over a prime field as Algorithms 12m, 12a, 13, 14m and 14, for reference. Incidentally, a code m attached to the end of the number of each of the algorithms represents that multiplicative ECADD is used, and a code a represents that additive ECADD is used.

(d-1) Algorithm 12m [xECADDm (Projective Coordinates)]
Input: P1=(X1:Z1), P2=(X2:Z2), P3'=(X3':Z3')=P1−P2, a, b
Output: P3=(X3:Z3)=P1+P2

$$X3=Z3'\times[X1\times X2-a\times Z1\times Z2]^2-4\times b\times Z1\times Z2\times(X1\times Z2+2\times Z1)$$

$$Z3=X3'\times(X1\times Z2-X2\times Z1)^2$$

(d-2) Algorithm 12a [xECADDA (Projective Coordinates)]
Input: P1=(X1:Z1), P2=(X2:Z2), P3'=(X3':Z3')=P1−P2, a, b
Output: P3=(X3:Z3)=P1+P2

$$S=2\times(X1\times Z2=X2\times Z1)\times(X1\times X2=a\times Z1\times Z2)+4\times b\times Z1^2\times Z2^2$$

$$T=(X1\times Z2-X2\times Z1)^2$$

$$X3=X3'\times S+X3'\times T$$

$$Z3=X3'\times T$$

(d-3) Algorithm 13 [xECDBL (Projective Coordinates)]
Input: P1=(X1:Z1), a, b
Output: P4=(X4:Z4)=2×P1

$$X4=(X1^2-a\times Z1^2)^2-8\times b\times X1\times Z1^3$$

$$Z4=4\times(X1\times Z1\times(X1^2+a\times Z1^2)+b\times Z1^4)$$

(d-4) Algorithm 14m [xECADDDBLm (Projective Coordinates)]
Input: P1=(X1:Z1), P2=(X2:Z2), P3'=(X3':Z3')=P1−P2, a, b
Output: P3=X3:Z3)=P1+P2, P4=(X4:Z4)=2×P1

$$X3=Z3'\times[(X1\times X2-a\times Z1\times Z2)^2-4\times b\times Z1\times Z2(X1\times Z2+2\times Z1)$$

$$Z3=X3'\times(X1\times Z2-X2\times Z1)^2$$

$X4=(X1^2-a\times Z1^2)^2-8\times b\times X1\times Z1^3$ $Z4=4\times(X1\times Z1\times(X1^2+1\times Z1^2)+b\times Z1^4$ (d-5) Algorithm 14a [xECADDDBLa (Projective Coordinates)]
Input: P1=(X1:Z1), P2=(X2:Z2), P3'=(X3':Z3')=P1−P2, a,b
Output: P3=(X3:Z3)=P1+P2, P4=(X4:Z4)=2×P1

$S=2\times(X1\times Z2+X2\times Z1)\times(X1\times Z2+a\times Z1\times Z2)+4\times b\times Z1^2\times Z2^2$ $T=(X1\times Z2-X2\times Z1)^2$ $X3=Z3'\times S+X3'\times T$ $Z3=Z3'\times T$ $X4=(X1^2-a\times Z1^)^2-8\times b\times X1\times Z1^3$ $Z4=4\times(X1\times Z1\times(X1^2+a\times Z1^2)+b\times Z1^4)$ According to the elliptic curve cryptosystem apparatus 11 of the third embodiment of this invention, the linear coordinate transforming unit 23 transforms coordinates (X:Y:Z) of a point on an elliptic curve E over a prime field GF(p) to coordinates (r1×(X−s1):r2×(Y−s2):r3×(Z−s3) on the basis of parameters (r1, r2, r3, s1, s2, s3)=(r, r, r, s, 0, 0), and the scalar multiplication processing unit 22 performs the elliptic curve addition and elliptic curve doubling in the linearly-transformed coordinates. Therefore, the randomizing effect similar to that of RPC in the Jacobian coordinates can be expected, and this embodiment is secured against DPA.

Since s≠0 in the above parameters, the special point whose x coordinate is 0 does not appear during the scalar multiplication because the X coordinate in the linearly-transformed coordinates is S. Thus, the apparatus is secure against the special point attack.

The above Algorithms 14m and 14a perform the addition and the doubling with one function by using xECADDDBLm or xECADDDBLa. It is thereby possible to decrease the number of times of recall of the function, which can speed up the process. It is also possible to decrease the amount of the computation because results of the operation can be commonly used in the addition and doubling.

(e) DESCRIPTION OF FOURTH EMBODIMENT

In the elliptic curve cryptosystem apparatus 11 according to a fourth embodiment of this invention, the scalar multiplication processing unit 22 in the elliptic curve cryptosystem apparatus 11 according to the third embodiment uses Montgomery-Ladder when performing the scalar multiplication d×P. Other parts are almost similar to those of the elliptic curve cryptosystem apparatus 11 according to the third embodiment. Shown below is an example of the algorithm used for the scalar multiplication by the scalar multiplication processing unit 22 as Algorithm 15.

| (e-1) Algorithm 15 [Montgomery-Ladder, x Coordinate System, Parameters (r,r,r,s,0,0)] |
|---|
| S1: T[0]:=xLC(P) |
| S2: T[1]:=xECDBL(T[0]) |
| S3: for i=n−2 downto 0{ |
| S4:     T[2]:=xECDBL(T[d[i]]) |
| S5:     T[1]:=xECADD(T[0],T[1],LC(P)) |
| S6:     T[0]:=T[2−d[i]] |
| S7:     T[1]:=T[1+d[i]] |

| (e-1) Algorithm 15 [Montgomery-Ladder, x Coordinate System, Parameters (r,r,r,s,0,0)] |
|---|
| S8: } |
| S9: return(invxLC(T[0]) | where, xLC represents transform to coordinates used in the x-coordinate-only method in the linear projective coordinates, invLC represents its inverse transform, T[0], T[1] and T[2] are temporary variables, d is an n-bit scalar value, and d[i] is the i-th LSB value of d.

The elliptic curve cryptosystem apparatus 11 according to the fourth embodiment can provide similar working effect to that provided by the above fourth embodiment, and is secure against the SPA and DPA because the apparatus 11 uses Montgomery-Ladder in Algorithm 15 used by the scalar multiplication processing unit 22.

(f) DESCRIPTION OF FIFTH EMBODIMENT

In the elliptic curve cryptosystem apparatus 11 according to a fifth embodiment of this invention, the scalar multiplication processing unit 22 uses improved Montgomery-Ladder when performing the scalar multiplication d×P. Other parts are almost similar to those of the elliptic curve cryptosystem apparatus 11 according to the fourth embodiment.

Like the above Algorithms 14m and 14a, the improved Montgomery-Ladder performs the addition and doubling with one function by using xECADDDBL, thereby to decrease the number of time of recall of the function, which can speed up the process. It is also possible to decrease the amount of computation by commonly using results of the operation in the addition and doubling. Shown below is an example of the algorithm used in the scalar multiplication by the scalar multiplication processing unit 22 as Algorithm 15'.

| (f-1) Algorithm 15' [Improved Montgomery-Ladder, x Coordinate System, Parameters (r,r,r,r,s,0,0)] |
|---|
| S1: T[0]:=xLC(P) |
| S2: T[1]:=xECDBL(T[0]) |
| S3 for i=n−2 downto 0{ |
| S4:(T[1−d[i]],T[d[i]]):=xECADDDBL(T[d[i]],T[1−d[i]],xLC(P)) |
| S5: } |
| S6: return(invxLC(T[0])) | where, xLC represents transform to coordinates used in the x coordinate system in the linear projective coordinates, invLC represents its inverse transform, T[0], T[1] and T[2] are temporary variables, d is an n-bit scalar value, and d[i] is the i-th LSB value of d.

The elliptic curve cryptosystem apparatus 11 according to the fifth embodiment of this invention can provide similar working effects to those provided by the above-described fourth embodiment. Since the scalar multiplication processing unit 22 uses xECADDDBL in Algorithm 15', the elliptic curve cryptosystem apparatus 11 performs the addition and doubling with one function, thereby to decrease the number of times of recall of the function, which can speed up the process. Since results of the operation are commonly used in the addition and doubling, it is possible to decrease the amount of the computation.

As above, the elliptic curve cryptosystem apparatus 11 according to each of the embodiments can perform the scalar multiplication in the elliptic curve cryptosystem, with resistance to the side channel attacks.

(g) SIXTH EMBODIMENT

In the elliptic curve cryptosystem apparatus 11 according to a sixth embodiment of this invention, the scalar multiplication processing unit 22 uses elliptic curve $2^k$ ($2^{\wedge}k$) multiplication (iECDBL) when performing the scalar multiplication d×P. Here, the elliptic curve $2^{\wedge}k$ multiplication signifies computation of a point $2^k \times P$ that is $2^k$ times a given point. The elliptic curve $2^k$ multiplication can be performed by successively performing the elliptic curve doubling k times. However, when the elliptic curve $2^k$ multiplication is processed as one function, it enables more efficient computation because the intermediate values can be cut as compared with a case where the elliptic curve doubling is successively applied.

For example, an algorithm for realizing the elliptic curve $2^k$ multiplication as shown in Algorithm 16 below is disclosed in K. Itoh, M. Takenaka, N. Torii, S. Temma, and Y. Kurihara, "Fast Implementation of Public-key Cryptography on DSP TMS320C6201", Cryptographic Hardware and Embedded Systems 1999 (CHES1999), Lecture Notes in Computer Science vol. 1717, pp. 61-72, Springer-Verlag, 1999 (referred to as document Itoh+99). Incidentally, this elliptic curve $2^k$ multiplication can be applied to an elliptic curve represented in Jacobian coordinates over a prime field.

---

(g-1) Algorithm 16 [iECDBL (Jacobian Coordinates)]
Input: P[0]=(X[0]:Y[0]:Z[0]),k,a
Output: P[k]=(X[k]:Y[k]:Z[k])=$2^{\wedge}k \times P[0]$

```
S01: W[0]:=a×Z0^4
S02: M[0]:=3×X[0]^2+W[0]
S03: S[0]:=4×X[0]×Y[0]^2
S04: T[0]:=8×Y[0]^4
S05: X[1]:=M[0]^2−2×S[0]
S06: Y[1]:=M[0]×(S[0]−X[1])−T[0]
S07: Z[1]:=2×Y[0]×Z[0]
S08: for(i=1;i<k;i++){
S09:   W[i]:=2×T[i−1]×W[i−1]
S10:   M[i]:=3×X[i]^2+W[i]
S11:   S[i]:=4×X[i]×Y[i]^2
S12:   T[i]:=8×Y[i]^4
S13:   X[i+1]:=M[i]^2−2×S[i]
S14:   Y[i+1]:=M[i]×(S[i]−X[i+1])−T[i]
S15:   Z[i+1]:=2×Y[i]×Z[i]: }
S16: }
S17: return((X[k]:Y[k]:Z[k]))
```

---

The above Algorithm 16 is an example where the elliptic $2^k$ multiplication is applied to Jacobian coordinates. Instead of Jacobian coordinates, the $2^k$ multiplication can be applied to the linearly-transformed coordinates transformed by the linear coordinate transforming unit 23 of this invention, thereby improving the operation speed.

The linear coordinate transforming unit 23 may perform the linear coordinate transform on the basis of parameters (r1, r2, r3, s1, s2, s3)=($r^{\wedge}2$, ($r^{\wedge}3$, r, s, 0, 0), or parameters (r1, r2, r3, s1, s2, s3)=(r, r, r, s, 0, 0).

(h) Others

Figure 5:
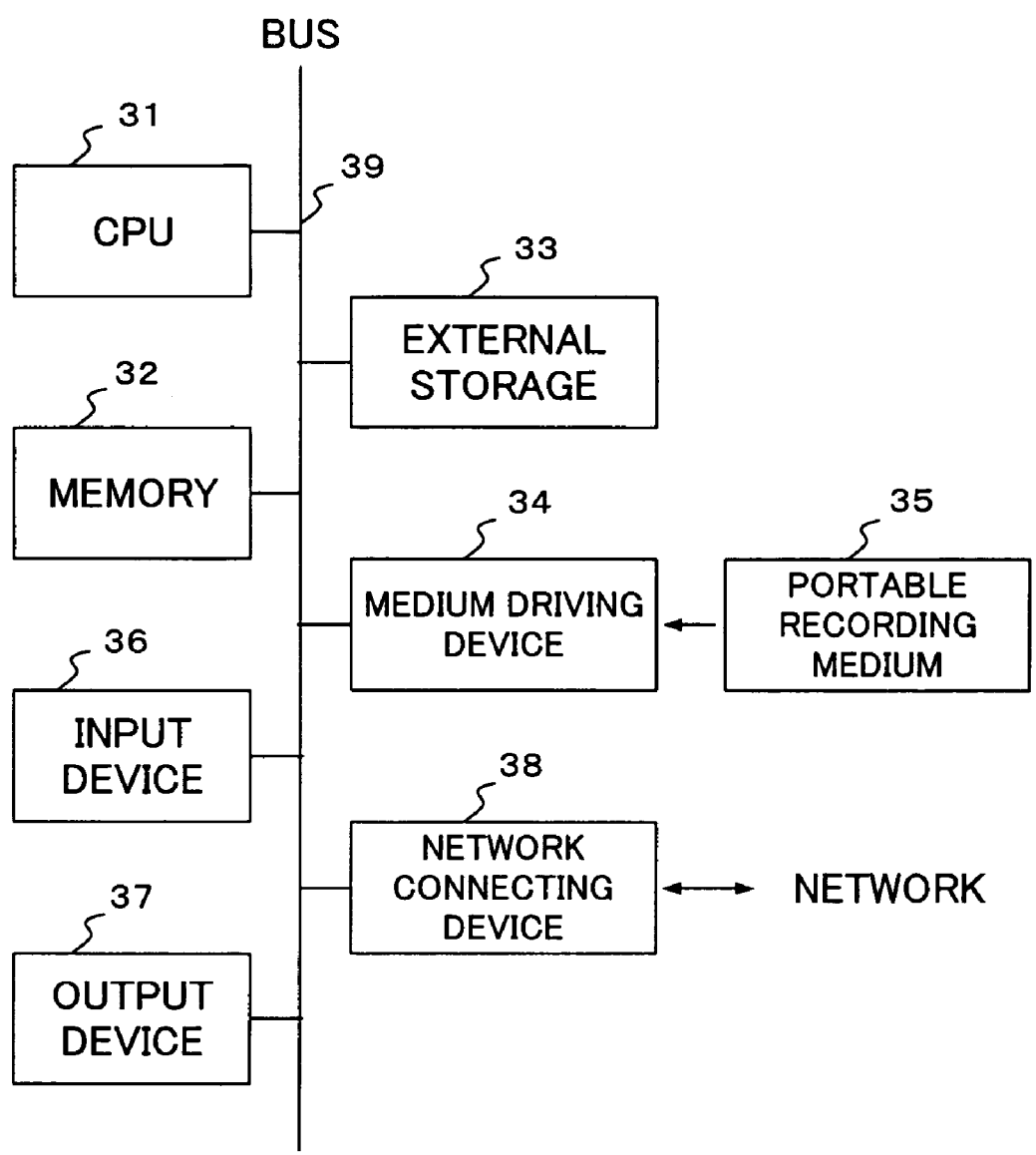
FIG. 5 is a diagram showing an example of a hardware structure of the elliptic curve cryptosystem apparatus executing an elliptic curve cryptosystem program according to this invention.

Next, description will be made of an example of a hardware structure of the elliptic curve cryptosystem apparatus executing the above elliptic curve cryptosystem program of this invention, with reference to FIG. 5. The elliptic curve cryptosystem apparatus can be realized with an information processing apparatus such as a personal computer or the like.

A CPU (Central Processing Unit) 31 executes elliptic addition, elliptic doubling and so forth of the elliptic curve cryptosystem. A memory 32 is used as various kinds of registers used in the operation. An external storage 33 stores therein an OS, the elliptic curve cryptosystem program, etc.

A medium driving device 34 is a device which performs reading or writing on a portable recording medium 35 such as a CDROM, DVD, flexible disk, IC card, etc.

An input device 36 is a device such as a keyboard or the like to input data. An output device 37 is a device such as a display, printer or the like. A network connecting device 38 is a device for connecting to a network such as Internet or the like, through which a program can be downloaded from a server on the network. Incidentally, the CPU 31, the memory 32, the external storage 33, the input device 36, etc. are connected through a bus 39.

The CPU 31 of the information processing apparatus executes the elliptic curve cryptosystem program, thereby functioning as the zero point determining unit 21, the scalar multiplication processing unit 22, the linear coordinate transforming unit (coordinate transforming unit) 23 and the random number generating unit 24 mentioned above.

The program (elliptic curve cryptosystem program) for realizing the functions as the zero point determining unit 21, the scalar multiplication processing unit 22, the linear coordinate transforming unit (coordinate transforming unit) 23 and the random number generating unit 24 is provided in a form where it is stored in a computer readable recording medium such as a CD-ROM, CD-R, CD-R/W, DVD, DVD-R, DVD-R/W, magnetic disk, optical disk, magneto-optical disk or the like. The computer reads the program from the recording medium, transfers and stores it in an internal storage or external storage to use it. Alternatively, the program may be recorded on a storage (recording medium) such as a magnetic disk, optical disk, magneto-optical disk or the like, and provided from the storage through a communication path to the computer.

When the functions as being the zero point determining unit 21, the scalar multiplication processing unit 22, the linear coordinate transforming unit (coordinate transforming unit) 23 and the random number generating unit 24 are realized, the program stored in the internal storage (the storage unit 16, the memory 32) is executed by a microprocessor (the arithmetic unit 12, the CPU 31) of the computer. At this occasion, the program recorded on the recording medium may be read out and executed by the computer.

In these embodiments, computer is a concept including hardware and an operating system, which signifies hardware operating under the control of the operating system. When the operating system is unnecessary and the application program solely operates the hardware, the hardware itself corresponds to the computer. The hardware comprises at least a microprocessor such as a CPU or the like, and a means for reading the computer program recorded on a recording medium. In these embodiments, the elliptic curve cryptosystem apparatus 11 has a function as the computer.

As recording media in these embodiments, it is possible to use any one of various kinds of computer readable media such as an IC card, ROM cartridge, magnetic tape, punched card, internal storage (memory such as RAM, ROM or the like) of the computer, external storage, printed matter on which codes such as bar codes are printed, etc., other than the above-mentioned flexible disk, CD-ROM, CD-R, CD-R/W, DVD, DVD-R, DVD-R/W, magnetic disk, optical disk and magneto-optical disk.

This invention can be applied to not only an exclusive apparatus for encrypting and decrypting the elliptic curve cryptography but also an IC card, DVD apparatus, cellular phone, personal computer, etc.

Note that this invention is not limited to the above embodiments, but may be modified in various ways without departing from the sprit and scope of the invention.

The arithmetic unit 12 functions as the zero determining unit 21, the scalar multiplication processing unit 22, the linear coordinate transforming unit 23 and the random number generating unit 24 by executing the program stored in the storage unit 16. However, this invention is not limited to this example. An external apparatus may perform a part of the functions of the zero determining unit 21, the scalar multiplication unit 22, the linear coordinate transforming unit 23 and the random number generating unit 24, for example, or may perform the function of only the scalar multiplication processing unit 22, for example.

The elliptic curve cryptosystem apparatus 11 of this invention may be accomplished by a smart card with a processor, for example. A secret key or only a secret key may be stored in a memory of the smart card, and an external apparatus (elliptic curve cryptosystem apparatus) communicably connected to the smart card may perform the elliptic curve cryptosystem processing.

In the above first and second embodiment, the linear coordinate transforming unit 23 performs the linear coordinate transformation on the basis of the parameters (r1, r2, r3, s1, s2, s3)=(r^2, (r^3, r, s, 0, 0). However, this invention is not limited to this example. A part (r1, r2, r3) of the parameters may be (r, r, r) like the third to fifth embodiments, or a part or all of r1, r2 and r3 may be numeral values different from one another, for example.

In the third to fifth embodiment, the linear coordinate transforming unit 23 performs the linear coordinate transform on the basis of the parameters (r1, r2, r3, s1, s2, s3)=(r, r, r, s, 0, 0). However, this invention is not limited to this example. A part (r1, r2, r3) of the parameters may be (r^2, (r^3, r) like the first and second embodiments, or a part or all of r1, r2 and r3 may be numeral values different from one another, for example.

In each of the above embodiments, a part (s1, s2, s3) of the parameters (r1, r2, r3, s1, s2, s3) used in the linear coordinate transform by the linear coordinate transforming unit 23 is not limited to this, but may be modified in various ways. For example, each of s1, s2 and s3 may be a value other than 0. Alternatively, only s1 and s3 may be 0, or only s1 and s2 may be 0, or only s3 may be 0, or only s2 may be 0, or only s1 may be 0, for example. Further, a part or all of s1, s2 and s3 may be numeral values different from one another.

By assigning a numeral value s that is not 0 to the parameter s1, the specific point whose x coordinate is 0 is represented as a point whose X coordinate is s in the linear transform coordinates, thus does not appear during the scalar multiplication. This can provide security against the specific point attack in relation with the x coordinate.

By assigning a numeral value s that is not 0 to the parameter s2, the specific point whose y coordinate is 0 is represented as a point whose Y coordinate is s in the linear transform coordinates, thus does not appear during the scalar multiplication. This can provide security against the specific point attack in relation with the y coordinate. Similarly, by assigning a numeral value s that is not 0 to the parameter s3, the specific point whose z coordinate is 0 is represented as a point whose Z coordinate is s in the linear transform coordinates, thus does not appear during the scalar multiplication. This can provide security against the specific point attack in relation with the z coordinate.

The scalar multiplication processing unit 22 may perform the scalar multiplication on coordinates undergone the linear coordinate transform by the linear coordinate transforming unit 23, using the window method (refer to Algorithms 6, 6', 6") This can provide security against the special point attack, as well as SPA.

In each of the above embodiments, this invention is applied to an elliptic curve over a finite field GF(p) (p is a prime number not less than 5) with p elements (p is a prime number not less than 5). However, this invention is not limited to this example, but may be modified in various ways without departing from the spirit and scope of the invention.

Disclosure of each of the embodiments of this invention enables a person skilled in the part to implement and manufacture the elliptic curve cryptosystem apparatus, the elliptic curve cryptosystem method, the elliptic curve cryptosystem program and the computer readable recording medium storing the elliptic curve cryptosystem program according to this invention.

INDUSTRIAL APPLICABILITY

The elliptic curve cryptosystem apparatus, the elliptic curve cryptosystem method, the elliptic curve cryptosystem program and the computer readable recording medium storing the elliptic curve cryptosystem program according to this invention are useful in the elliptic curve cryptogsystem processing, and effective to, particularly, the side channel attacks, as above.

What is claimed is:

1. An elliptic curve cryptosystem apparatus performing an elliptic curve cryptosystem process comprising:
    a coordinate transforming unit for transforming coordinates (X:Y:Z) of a point P on an elliptic curve over a finite field GF(p^m) to coordinates (r1)×(X−s1):r2×(Y−s2):r3×(Z−s3)) (where p is a prime number, m is an integer not less than 1, r1, r2 and r3 are integers not less than 1 and not larger than (p−1), s1, s2 and s3 are integers not less than 0 and not larger than (p−1), and a code "^" represents power); and
    a scalar multiplication operating unit for performing scalar multiplication on the point on the elliptic curve transformed by said coordinate transforming unit;
    at least any one of the parameters s1, s2 and s3 having a value other than 0.

2. The elliptic curve cryptosystem apparatus according to claim 1, wherein said scalar multiplication operating unit performs the scalar multiplication in a binary method using add-and-double-always.

3. The elliptic curve crypto system apparatus according to claim 1, wherein said scalar multiplication operating unit performs the scalar multiplication in a Montgomery-Ladder method.

4. The elliptic curve cryptosystem apparatus according to claim 1, wherein said scalar multiplication operating unit performs the scalar multiplication in a window method.

5. The elliptic curve crypto system apparatus according to claim 1, wherein said scalar multiplication operating unit performs the scalar multiplication in an x coordinate method.

6. The elliptic curve cryptosystem apparatus according to claim 1, wherein said scalar multiplication operating unit performs the scalar multiplication, using successive elliptic curve doubling.

7. An elliptic curve cryptosystem method executed on a computer for performing an elliptic curve cryptosystem process comprising:

a coordinate transforming step of transforming coordinates (X:Y:Z) of a point P on an elliptic curve over a finite field $GF(p^m)$ to coordinates $(r1\times(X-s1):r2\times(Y-s2):r3\times(Z-s3))$ (where p is a prime number, m is an integer not less than 1, r1, r2 and r3 are integers not less than 1 and not larger than (p−1), s1, s2 and s3 are integers not less than 0 and not larger than (p−1), and a code "^" represents power); and a scalar multiplication operating step of performing scalar multiplication on the point on the elliptic curve transformed at said coordinate transforming step;

at least any one of said parameters s1, s2 and s3 having a value other than 0.

8. The elliptic curve cryptosystem method according to claim 7, wherein, at said scalar multiplication operating step, the scalar multiplication is performed in a binary method using add-and-double-always.

9. The elliptic curve cryptosystem method according to claim 7, wherein, at said scalar multiplication operating step, the scalar multiplication is performed in a Montgomery-Ladder method.

10. The elliptic curve cryptosystem method according to claim 7, wherein, at said scalar multiplication operating step, the scalar multiplication is performed in a window method.

11. The elliptic curve crypto system method according to claim 7, wherein, at said scalar multiplication operating step, the scalar multiplication is performed in an x-coordinate-only method.

12. The elliptic curve cryptosystem method according to claim 7, wherein, at said scalar multiplication operating step, the scalar multiplication is performed, using successive elliptic curve doubling.

13. An elliptic curve cryptosystem program executed on a computer for performing an elliptic an elliptic curve cryptosystem process making the computer function as a coordinate transforming unit for transforming coordinates (X:Y:Z) of a point P on an elliptic curve over a finite field $GF(p^m)$ to coordinates $(r1\times(X-s1):r2\times(Y-s2):r3\times(Z-s3))$ (where p is a prime number, m is an integer not less than 1, r1,r2 and r3 are integers not less than 1 and not larger than (p−1), s1, s2 and s3 are integers not less than 0 and not larger than (p−1) and at least any one of s1, s2 and s3 has a value other than 0, and a code "^" represent power); and a scalar multiplication operating unit for performing scalar multiplication on the point on the elliptic curve transformed by said coordinate transforming unit.

14. A computer readable recording medium storing an elliptic curve cryptosystem program for performing an elliptic curve cryptosystem process, said elliptic curve cryptosystem program making a computer function as a coordinate transforming unit for transforming coordinates (X:Y:Z) of a point P on an elliptic curve over a finite field $CF(p^m)$ to coordinates $(r1\times(X-s1):r2\times(Y-s2):r3\times(Z-s3))$ (where p is a prime number, m is an integer not less than 1, r1, r2 and r3 are integers not less than 1 and not larger than (p−1), s1, s2 and s3 are integers not less than 0 and not larger than (p−1) and at least any one of s1, s2 and s3 has a value other than 0, and a code "^" represents power); and a scalar multiplication operating unit for performing scalar multiplication on the point on the elliptic curve transformed by said coordinate transforming unit.

15. The computer readable recording medium storing an elliptic curve cryptosystem program according to claim 14, wherein the scalar multiplication is performed in a binary method using add-and-double-always when said computer functions as said scalar multiplication operating unit.

16. The computer readable recording medium storing an elliptic curve cryptosystem program according to claim 14, wherein the scalar multiplication is performed in a Montgomery-Ladder method when said computer functions as said scalar multiplication operating unit.

17. The computer readable recording medium storing an elliptic curve cryptosystem program according to claim 14, wherein the scalar multiplication is performed in a window method when said computer functions as said scalar multiplication operating unit.

18. The computer readable recording medium storing an elliptic curve cryptosystem program according to claim 14, wherein the scalar multiplication is performed in an x-coordinate-only method when said computer functions as said scalar multiplication operating unit.

19. The computer readable recording medium storing an elliptic curve cryptosystem program according to claim 14, wherein the scalar multiplication is performed, using successive elliptic curve doubling, when the computer functions as said scalar multiplication operating unit.

* * * * *